United States Patent
Hiller

(10) Patent No.: US 12,202,617 B2
(45) Date of Patent: Jan. 21, 2025

(54) AIRCRAFT LASER CONTRAIL REDUCTION APPARATUS AND SYSTEM

(71) Applicant: THE BOEING COMPANY, Chicago, IL (US)

(72) Inventor: Nathan D. Hiller, Irvine, CA (US)

(73) Assignee: The Boeing Company, Arlington, VA (US)

( * ) Notice: Subject to any disclaimer, the term of this patent is extended or adjusted under 35 U.S.C. 154(b) by 93 days.

(21) Appl. No.: 17/653,995

(22) Filed: Mar. 8, 2022

(65) Prior Publication Data

US 2022/0332430 A1 Oct. 20, 2022

Related U.S. Application Data

(60) Provisional application No. 63/201,216, filed on Apr. 19, 2021.

(51) Int. Cl.
*B64D 33/04* (2006.01)
*B64D 15/12* (2006.01)
(Continued)

(52) U.S. Cl.
CPC .............. *B64D 33/04* (2013.01); *B64D 15/12* (2013.01); *B64D 15/20* (2013.01); *F02C 9/28* (2013.01); *F05D 2220/323* (2013.01); *F05D 2270/081* (2013.01); *F05D 2270/311* (2013.01); *F05D 2270/313* (2013.01)

(58) Field of Classification Search
CPC ...................................................... B64D 33/04
See application file for complete search history.

(56) References Cited

U.S. PATENT DOCUMENTS 2,308,060 A 1/1943 De Rochefort-Lucay
3,289,409 A * 12/1966 Schirmer ................. B64D 1/20
239/265.17
(Continued)

FOREIGN PATENT DOCUMENTS

DE 10 2008 028067 12/2009
EP 4 080 694 A1 10/2022
FR 561860 10/1923

OTHER PUBLICATIONS

"Contrails K-12", National Aeronautics and Space Administration, Museum in a Box series, 2010, pp. 1-20. [https://www.nasa.gov/sites/default/files/atoms/files/contrails_k-12.pdf accessed on Aug. 1, 2023] (Year: 2010).*

(Continued)

*Primary Examiner* — Lorne E Meade

(57) ABSTRACT

A method, system and apparatus are provided for reducing or eliminating contrails formed by an aircraft as it travels through the sky, and more particularly, to disrupting formation of contrails and altering the electromagnetic properties of already-formed contrails through use of one or more lasers. Methods include: positioning at least one laser such that at least one beam from the at least one laser is directed to a position at which contrails form aft of a wing of the aircraft; detecting contrail formation in the position at which contrails form aft of the wing of the aircraft; activating the at least one laser source in response to detecting contrail formation; and reducing or eliminating the contrail in response to activating the at least one laser source.

20 Claims, 10 Drawing Sheets

(51) Int. Cl.
  *B64D 15/20* (2006.01)
  *F02C 9/28* (2006.01)

(56) References Cited

U.S. PATENT DOCUMENTS

| | | | | |
|---|---|---|---|---|
| 3,517,505 | A * | 6/1970 | Silverman | F02C 3/30 239/265.17 |
| 3,600,948 | A * | 8/1971 | Luce | G01L 7/066 73/386 |
| 4,122,618 | A | 10/1978 | Gay | |
| 4,561,201 | A | 12/1985 | Sanborn | |
| 5,005,355 | A * | 4/1991 | Singh | F02C 3/30 60/264 |
| 5,269,288 | A * | 12/1993 | Stirbl | F24S 23/00 219/121.85 |
| 5,285,256 | A * | 2/1994 | Nelson | G01S 17/04 356/342 |
| 5,546,183 | A * | 8/1996 | Fegley | G01N 15/0205 356/336 |
| 5,992,065 | A | 11/1999 | Preiser | |
| 7,077,325 | B2 | 7/2006 | Tan et al. | |
| 7,082,706 | B1 | 8/2006 | Stinis et al. | |
| 7,710,643 | B2 | 5/2010 | Mitchell-Dignan et al. | |
| 8,402,736 | B2 * | 3/2013 | Noppel | F01D 25/30 60/770 |
| 8,406,465 | B1 | 3/2013 | Garrett | |
| 8,833,701 | B2 * | 9/2014 | Bright | B64D 1/18 244/136 |
| 9,038,453 | B2 * | 5/2015 | Paris | G01P 5/18 73/170.02 |
| 9,298,161 | B2 * | 3/2016 | Belicofski | G03H 1/0402 |
| 9,311,539 | B1 | 4/2016 | Garrett | |
| 10,902,759 | B1 | 1/2021 | Hiller | |
| 11,250,742 | B2 | 2/2022 | Hiller | |
| 2006/0071929 | A1 | 4/2006 | Stinis et al. | |
| 2016/0267825 | A1 | 9/2016 | Stewart | |
| 2019/0152159 | A1 * | 5/2019 | Caldwell | B29C 65/1667 |
| 2020/0017236 | A1 | 1/2020 | Scheidler | |

OTHER PUBLICATIONS

Mitrofanov, A., Voronin, A., Sidorov-Biryukov, D. et al., "Mid-infrared laser filaments in the atmosphere", Scientific Reports, vol. 5:8368, Feb. 17, 2015, pp. 1-6. (Year: 2015).*

Masamori Endo, "Generation of multikilowatt radially or azimuthally polarized CO2 laser beams by a triple-axicon optical resonator", Proceedings SPIE vol. 7579, Laser Resonators and Beam Control XII, 75790F, Feb. 17, 2010, pp. 1-9. (Year: 2010).*

Toshimitsu Sakurai, et al., "Studies of melting ice using CO2 laser for ice drilling", Cold Regions Science and Technology, vol. 121, 2016, pp. 11-15. (Year: 2016).*

Iftach Nevo, et al., "Evidence for laser-induced homogeneous oriented ice nucleation revealed via pulsed x-ray diffraction", The Journal of Chemical Physics, vol. 153, Jul. 13, 2020, pp. 1-9. (Year: 2020).*

Notification of European Publication Number and Information for EP Application No. 22166018.6 mailed Sep. 28, 2022.

Chien, Loring, How does Dot-Matrix Skywriting Work? Quora, Feb. 11, 2018, 1 page, [retrieved from the internet Mar. 25, 2021 <https://www.quora.com/How-does-dot-matrix-skywriting-work-answer/Loring-Chien>].

Graham-Rowe, Duncan, "Aircraft vapour trails are climate scourge," New Scientist, Oct. 19, 2002. [Retrieved from the Internet Jan. 22, 2021: <URL: https://www.newscientist.com/article/dn2926-aircraft-vapour-trails-are-climate-scourge/>].

U.S. Appl. No. 16/747,664, Non-Final Office Action mailed Jun. 23, 2020.

U.S. Appl. No. 16/747,701, Non-Final Office Action mailed Mar. 30, 2021.

* cited by examiner

AIRCRAFT LASER CONTRAIL REDUCTION APPARATUS AND SYSTEM

CROSS-REFERENCE TO RELATED APPLICATIONS

This application claims priority to U.S. Provisional Patent Application No. 63/201,216, filed on Apr. 19, 2021, the contents of which are hereby incorporated by reference in their entirety.

TECHNICAL FIELD

A method, system and computer program product are provided in accordance with example embodiments described herein for reducing or eliminating contrails formed by an aircraft as it travels through the sky, and more particularly, to disrupting formation of contrails and altering the electromagnetic properties of already-formed contrails through use of one or more lasers.

BACKGROUND

Aircraft travel has become a conventional means of travel and is no longer accessible only to the well-heeled. With the widespread accessibility of air travel comes the increasing number of aircraft and flights available from thousands of airports throughout the world. A common form of air travel is on planes that use jet engines and fly at altitudes above 25,000 feet. At some altitudes and environmental conditions, condensation trails (also referred to herein as "contrails") may form.

Contrails can be produced by aircraft as they fly at relatively high altitudes, such as above 30,000 feet. Contrails are typically linearly formed clouds formed of ice particles that form in the wake of aircraft. Contrails are formed through two primary formation processes, both of which are byproducts of aircraft travel. The first formation process is through pressure changes that result from the aircraft traveling through the atmosphere. Aircraft wings function by providing lift due to pressure differences imparted by the shape of the wing as it passes through the air. Air pressure changes through wingtip vortices or the air over the entire wing can cause low pressure regions to form behind the wings. Low pressure regions trailing aircraft structures such as wings can cause droplets of water to condense from the atmosphere. These droplets may freeze due to the cold temperatures at altitude and form contrails of linear clouds trailing the aircraft wings. Contrails may also be formed through water vapor produced in aircraft engine exhaust as a byproduct of combustion. The water vapor exiting the jet engine can freeze and form contrails of linear clouds trailing the aircraft engines. There is a desire for a system and method to reduce or eliminate contrails formed by an aircraft.

BRIEF SUMMARY

A method, apparatus, and system are provided for reducing or eliminating contrails formed by an aircraft as it travels through the sky, and more particularly, to disrupting formation of contrails and altering the electromagnetic properties of already-formed contrails through use of one or more lasers. Embodiments provided herein include a system for reducing or eliminating contrails behind an aircraft, the system including: a controller; and a laser source, where the controller is configured to, in response to receiving an indication of at least one of contrail formation or conditions determined to be conducive to contrail formation, cause the laser source to emit one or more laser beams toward a location behind the aircraft where contrails form under conditions conducive to contrail formation. The laser source is directed toward a location behind the aircraft where contrails form under conditions conducive to contrail formation. According to some embodiments, conditions determined by the controller to be conducive to contrail formation include a temperature below a predefined temperature threshold and an altitude above a predefined altitude threshold. The controller of some embodiments is configured to cause the laser source to activate in response to conditions determined by the controller to be conducive to persistent contrail formation. The laser source of some embodiments includes a bank of fiber lasers, where fiber lasers of the bank of fiber lasers are positioned to direct laser beams in a direction aft of a wing of the aircraft.

According to an example embodiment, the laser source includes a bank of fiber lasers, where one or more laser beams emitted from the laser source are conducted through one or more fibers to one or more locations proximate an exhaust exit of a jet engine. The one or more laser beams of some embodiments are steerable to dynamically move an aim of the one or more laser beams in response to an indication of a location where contrails have formed. The one or more laser beams of some embodiments are swept to cover the location behind the aircraft where contrails form under conditions conducive to contrail formation. The one or more laser beams of some embodiments include a first laser beam and a second laser beam, where the first laser beam is configured to ionize particles of a contrail and the second laser beam is configured to heat particles of the contrail. The first laser beam and the second laser beam of some embodiments overlap. According to some embodiments, the first laser beam intersects a formed contrail at a first distance aft of a jet engine of the aircraft and the second laser beam intersects the formed contrail at a second distance aft of the jet engine of the aircraft, different than the first distance. Some embodiments include at least one sensor configured to detect at least one of contrail formation or conditions conducive to contrail formation, where the laser source caused to emit one or more laser beams is caused to adjust the one or more laser beams in response to sensor data from the at least one sensor. The laser source caused to emit one or more laser beams is, in some embodiments, caused to adjust polarization of the one or more laser beams in response to a determined alignment of ice crystals in a formed contrail. An example embodiment includes an aircraft incorporating the aforementioned system.

Embodiments provided herein include a method for reducing or eliminating contrails behind an aircraft including: receiving an indication of at least one of contrail formation or conditions determined to be conducive to contrail formation; activating at least one laser source in response to receiving the indication so as to direct at least one laser beam toward a location at which contrails form aft of a wing of the aircraft; and reducing or eliminating contrails in response to activating the at least one laser source. Embodiments optionally include determining conditions proximate the wing of the aircraft conducive to contrail formation and activating the at least one laser source in response to determining conditions proximate the wing of the aircraft conducive to contrail formation. Determining conditions proximate the wing of the aircraft conducive to contrail formation, in some embodiments, includes determining conditions proximate the wing of the aircraft conducive to persistent contrail formation. Conditions proximate the wing of the aircraft conducive to contrail formation include, in some embodiments, a temperature below a predefined temperature threshold and an altitude above a predefined altitude threshold.

According to some embodiments, the at least one laser source includes a bank of fiber lasers, where positioning the at least one laser source such that at least one beam from the at least one laser source is directed to a location at which contrails form aft of the wing of the aircraft includes positioning at least one fiber laser of the bank of fiber lasers to direct the at least one beam along a path of exhaust from a jet engine of the aircraft. Reducing or eliminating the contrail in response to activating the at least one laser source, in some embodiments, includes at least one of: heating water droplets or ice crystals in the location at which contrails form aft of the wing of the aircraft; or fragmenting water droplets or ice crystals in the location at which contrails form aft of the wing of the aircraft. Activating the at least one laser source in response to receiving the indication, in some embodiments, includes activating at least one pulsed laser source in response to receiving the indication.

Reducing or eliminating the contrail in response to activating the at least one laser source includes, in some embodiments, modifying electromagnetic properties of the contrail. Modifying the electromagnetic properties of contrails formed by an aircraft in response to activating the at least one laser include, in some embodiments, at least one of: intercepting, with the at least one laser, water droplets or ice crystals in the location at which contrails form aft of the wing of the aircraft; or modifying water droplets or ice crystals in the location at which contrails form aft of the wing of the aircraft to reduce infrared reflective properties of the water droplets or ice crystals. According to some embodiments the method includes positioning the at least one laser source at an exit of a jet engine of the aircraft to form the at least one laser beam along a path of exhaust exiting the jet engine of the aircraft.

Embodiments provided herein include a method for modifying electromagnetic properties of contrails formed by an aircraft, the method including: positioning at least one laser such that at least one beam from the at least one laser is directed to a position at which contrails form aft of a wing of an aircraft; detecting contrail formation in the position at which contrails form aft of the wing of the aircraft; activating the at least one laser in response to detecting contrail formation; and modifying electromagnetic properties of the contrail in response to activating the at least one laser. Methods of some embodiments include determining conditions proximate the wing of the aircraft conducive to contrail formation; and activating the at least one laser in response to determining conditions proximate the wing of the aircraft conducive to contrail formation.

According to some embodiments, determining conditions proximate the wing of the aircraft conducive to contrail formation includes determining conditions proximate the wing of the aircraft conducive to persistent contrail formation. According to some embodiments, the conditions proximate the wing of the aircraft conducive to contrail formation include a temperature below a predefined threshold and an altitude above a predefined threshold. According to some embodiments, the at least one laser includes a bank of fiber lasers, where positioning at least one laser such that at least one beam from the at least one laser is directed to a position at which contrails form aft of a wing of an aircraft includes positioning at least one fiber laser of the bank of fiber lasers to direct a beam from the at least one fiber laser along a path of exhaust from a jet engine of the aircraft.

According to some embodiments, modifying electromagnetic properties of contrails formed by an aircraft in response to activating the at least one laser includes at least one of: intercepting, with the at least one laser, water droplets or ice crystals in the position at which contrails form aft of the wing of the aircraft; or modifying water droplets or ice crystals in the position at which contrails form aft of the wing of the aircraft to reduce infrared reflective properties of the water droplets or ice crystals. According to some embodiments, activating the at least one laser in response to detecting contrail formation includes activating at least one pulsed laser in response to detecting contrail formation. According to some embodiments, positioning the at least one laser such that at least one beam from the at least one laser is directed to a position at which contrails form aft of a wing of an aircraft includes positioning the at least one laser at an exit of a jet engine of the aircraft to form at least one laser beam along a path of exhaust exiting the jet engine of the aircraft.

According to an example embodiment, a method is provided for reducing or eliminating ice crystals in an atmosphere including: identifying a presence of an ice crystal cloud in the atmosphere; activating at least one laser source to direct at least one laser beam toward a location of the ice crystal cloud; and reducing or eliminating ice crystals in the ice crystal cloud in response to activating the at least one laser source. The method of an embodiment includes: receiving an indication of environmental conditions around the aircraft conducive to formation of ice crystals; and activating the at least one laser in response to receiving the indication of conditions around the aircraft conducive to ice crystal formation. Receiving the indication of conditions around the aircraft conducive to ice crystal formation, in some embodiments, includes receiving an indication of conditions around the aircraft conducive to persistent ice crystal formation. The conditions around the aircraft conducive to ice crystal formation, in some embodiments, includes a temperature below a predefined temperature threshold and an altitude above a predefined altitude threshold. The method of some embodiments includes routing the aircraft through a location where ice crystal formation is likely.

Embodiments provided herein include a system for reducing or eliminating contrails behind an aircraft, the system including a controller; and a laser source, where the laser source is configured to emit at least one laser beam from at least one location proximate an exhaust exit of a jet engine, where the controller is configured to, in response to receiving an indication of at least one of contrail formation or conditions determined to be conducive to contrail formation, cause the laser source to emit the at least one laser beam toward a location behind the aircraft where contrails form under conditions conducive to contrail formation. The laser source of some embodiments includes a bank of fiber lasers, where at least one laser beam from the laser source is conducted through at least one fiber to the location proximate the exhaust exit of the jet engine.

According to an example embodiment, the at least one laser beam is steerable to dynamically move an aim of the laser beam in response to an indication of a location where contrails have formed. The at least one laser beam of some embodiments is swept to cover the location behind the aircraft where contrails form under conditions conducive to contrail formation. The at least one laser beam of some embodiments includes a first laser beam and a second laser beam, where the first laser beam is configured to ionize particles of a contrail and the second laser beam is configured to heat particles of the contrail. The first laser beam and second laser beam of some embodiments overlap.

According to some embodiments, the first laser beam intersects a formed contrail at a first distance aft of a jet engine of the aircraft and the second laser beam intersects the formed contrail at a second distance aft of the jet engine of the aircraft, different from the first distance. Systems of an example embodiment include at least one sensor configured to detect at least one of contrail formation or conditions conducive to contrail formation, where the laser source configured to emit at least one laser beam is configured to adjust the at least one laser beam in response to sensor data from the at least one sensor. The laser source configured to emit at least one laser beam of some embodiments is configured to adjust polarization of the at least one laser beam in response to a determined alignment of ice crystals in a formed contrail.

BRIEF DESCRIPTION OF THE DRAWINGS

Figure 1:
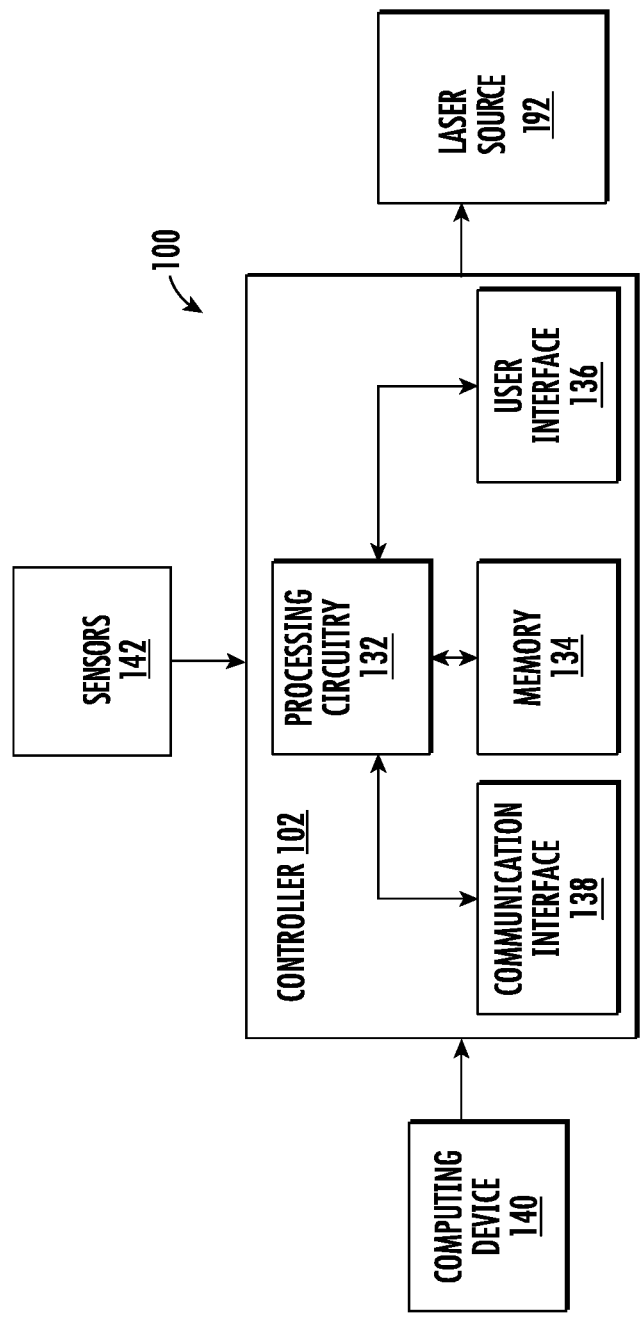
Figure 2:
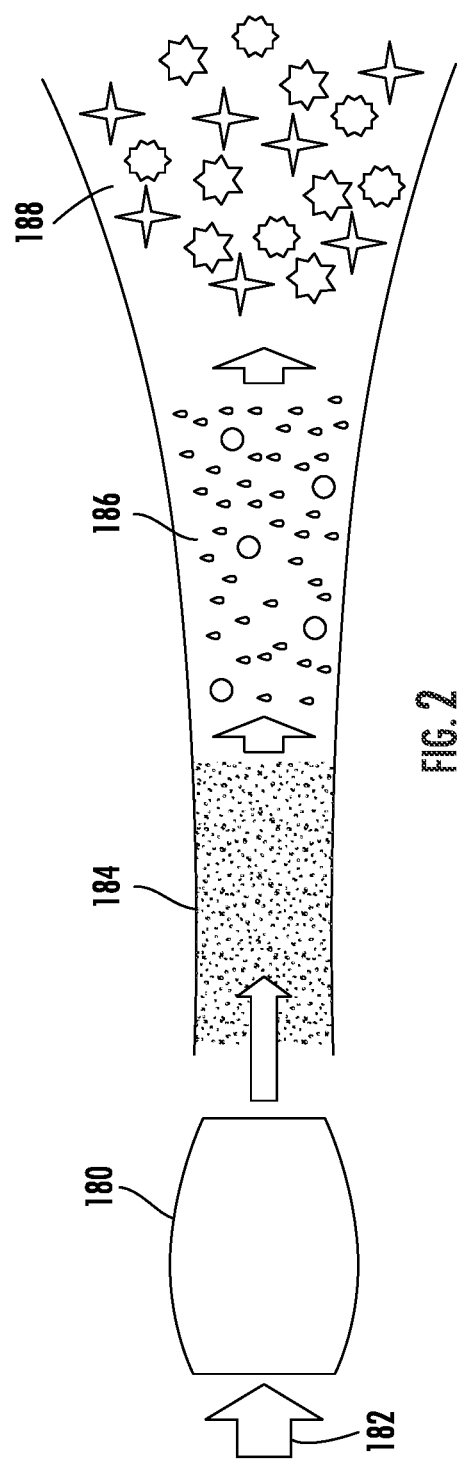
Figure 3:
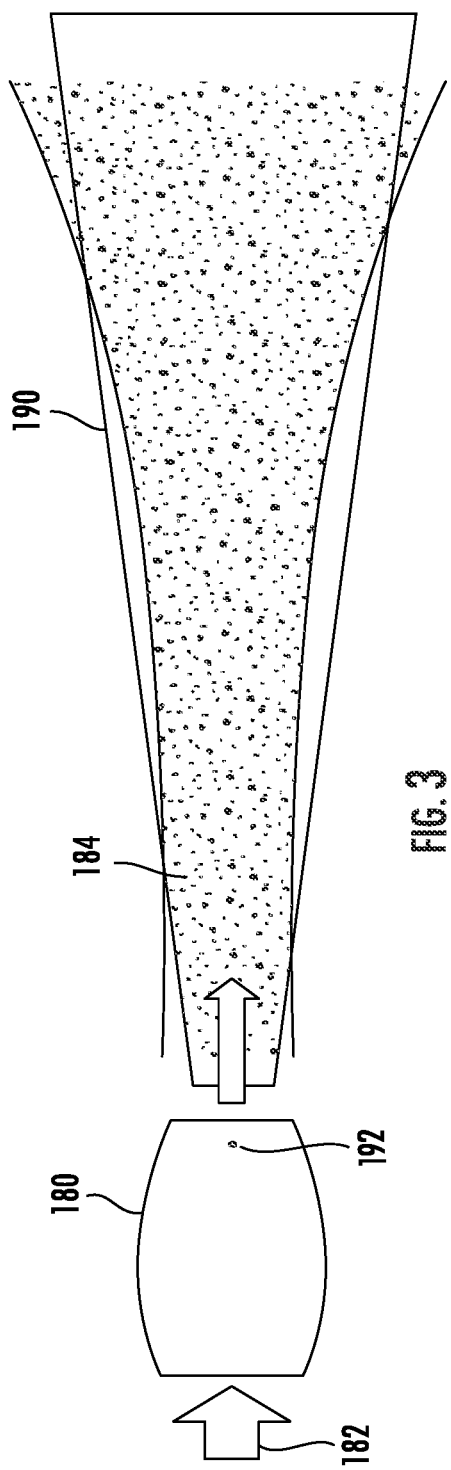
Figure 4:
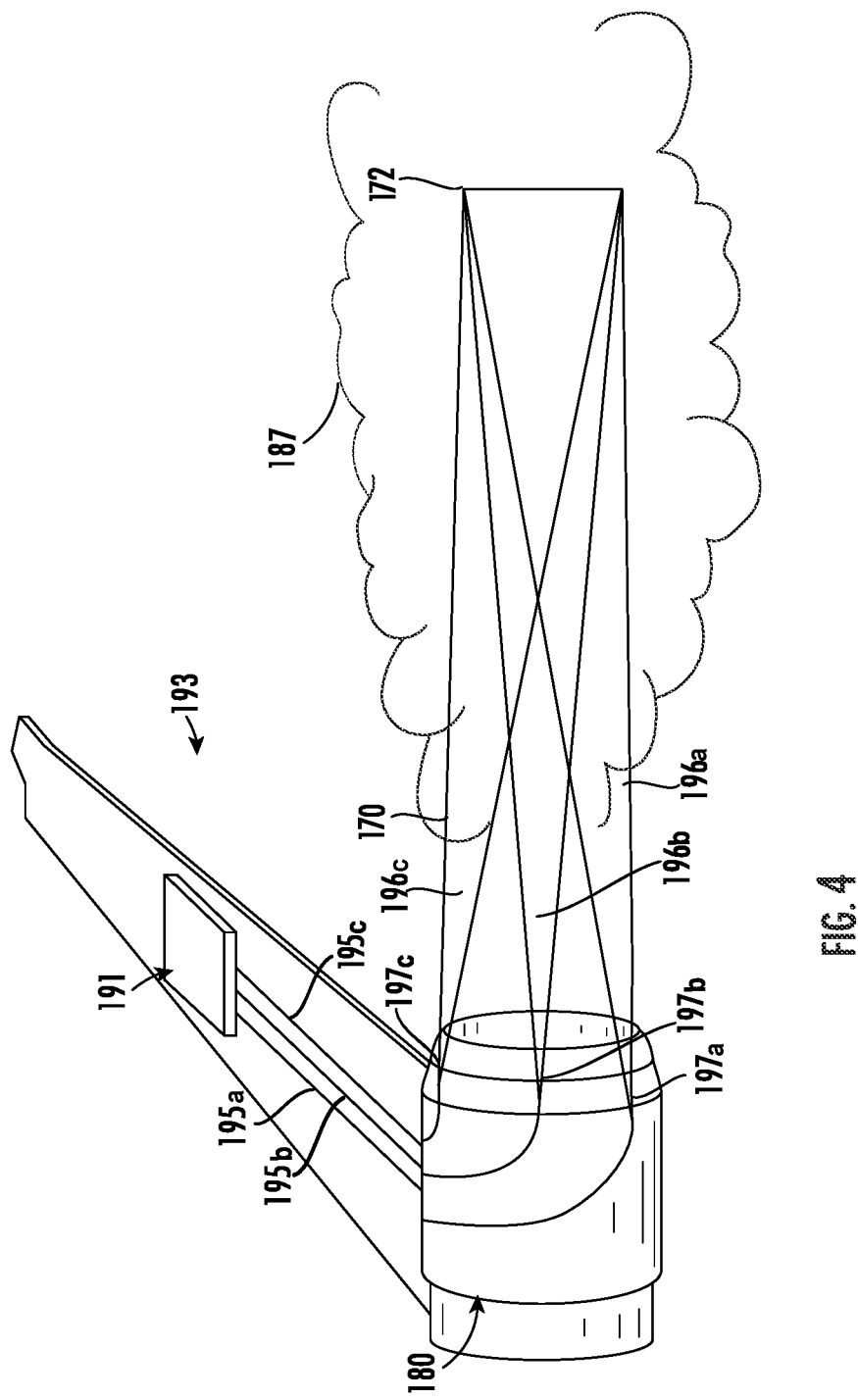
Figure 5:
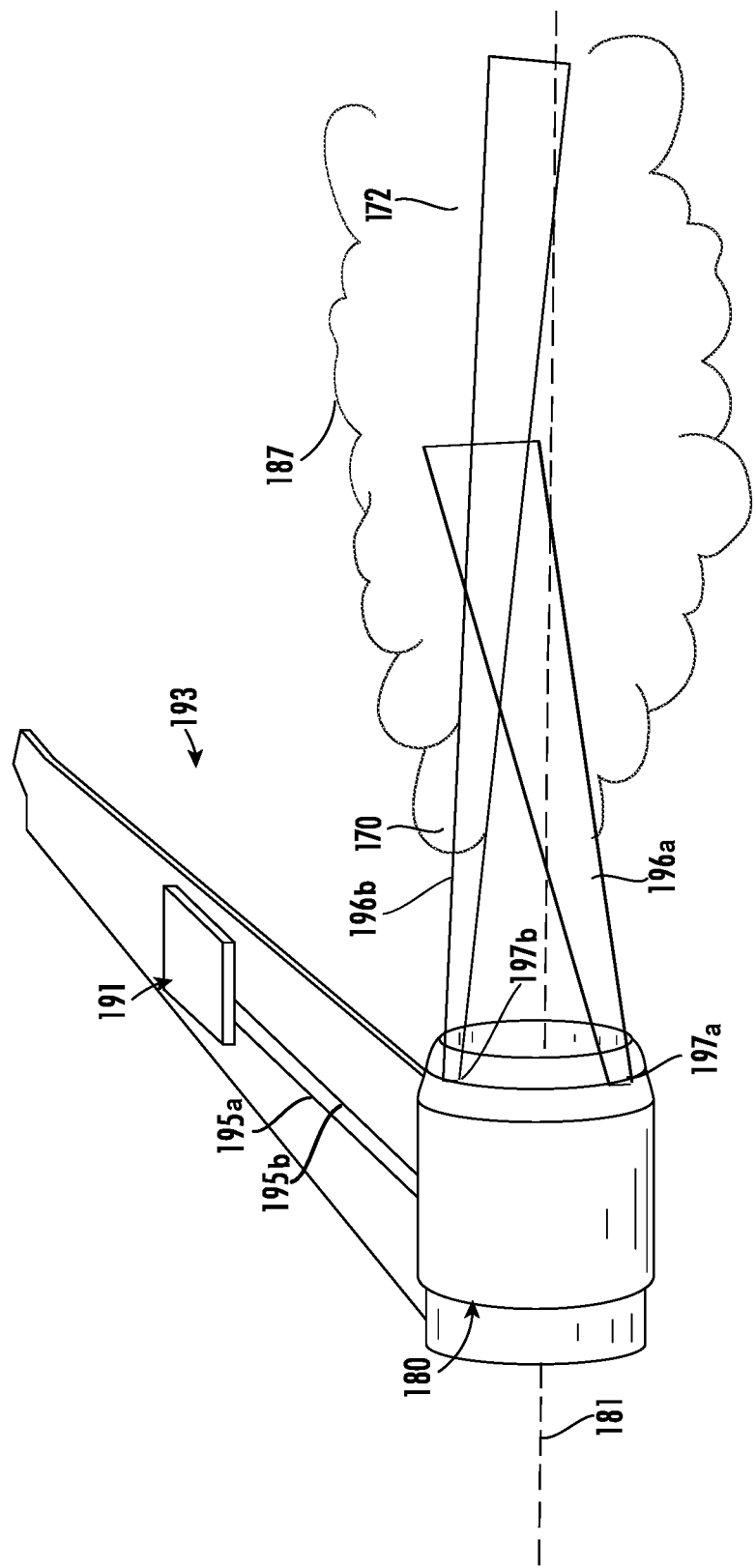
Figure 6:
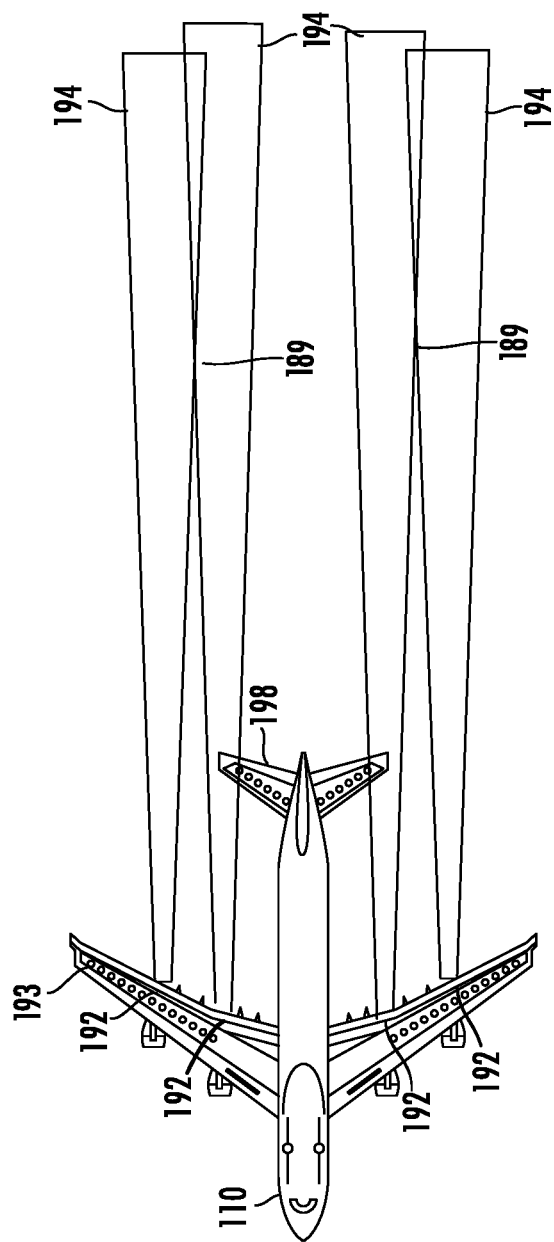
Figure 7:
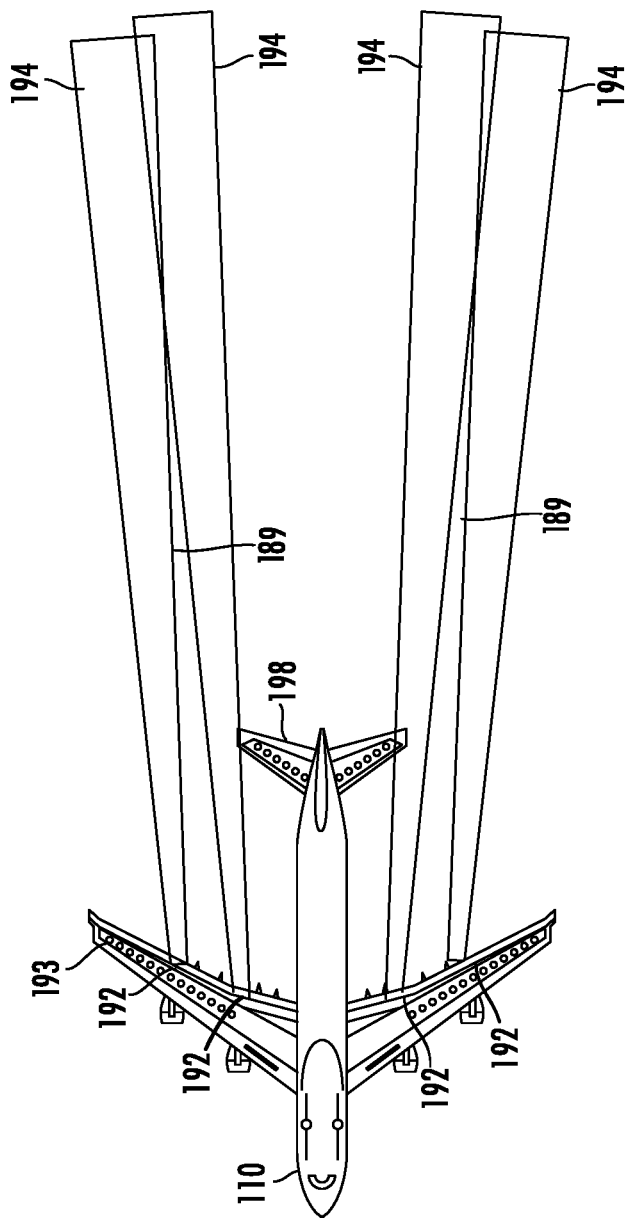
Figure 8:
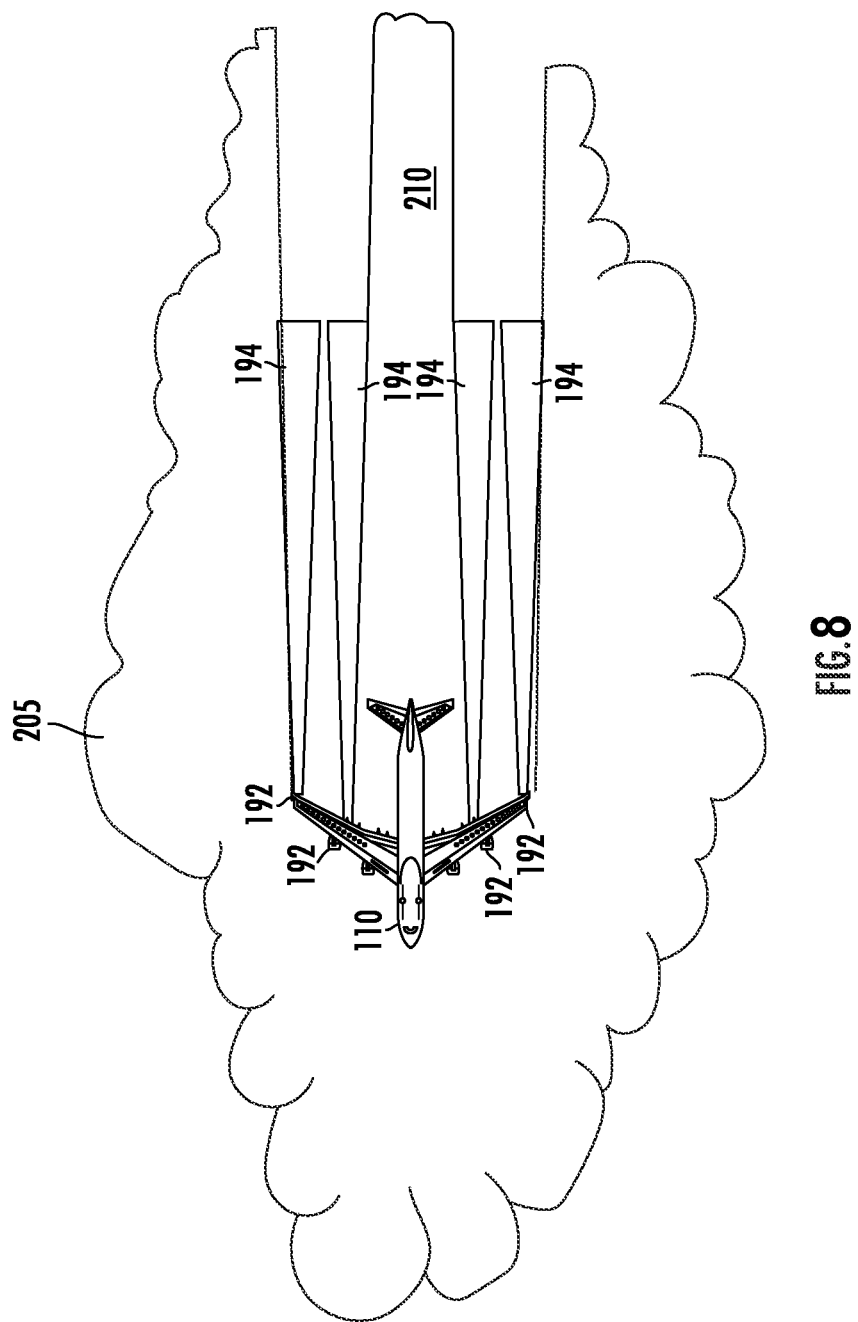
Figure 9:
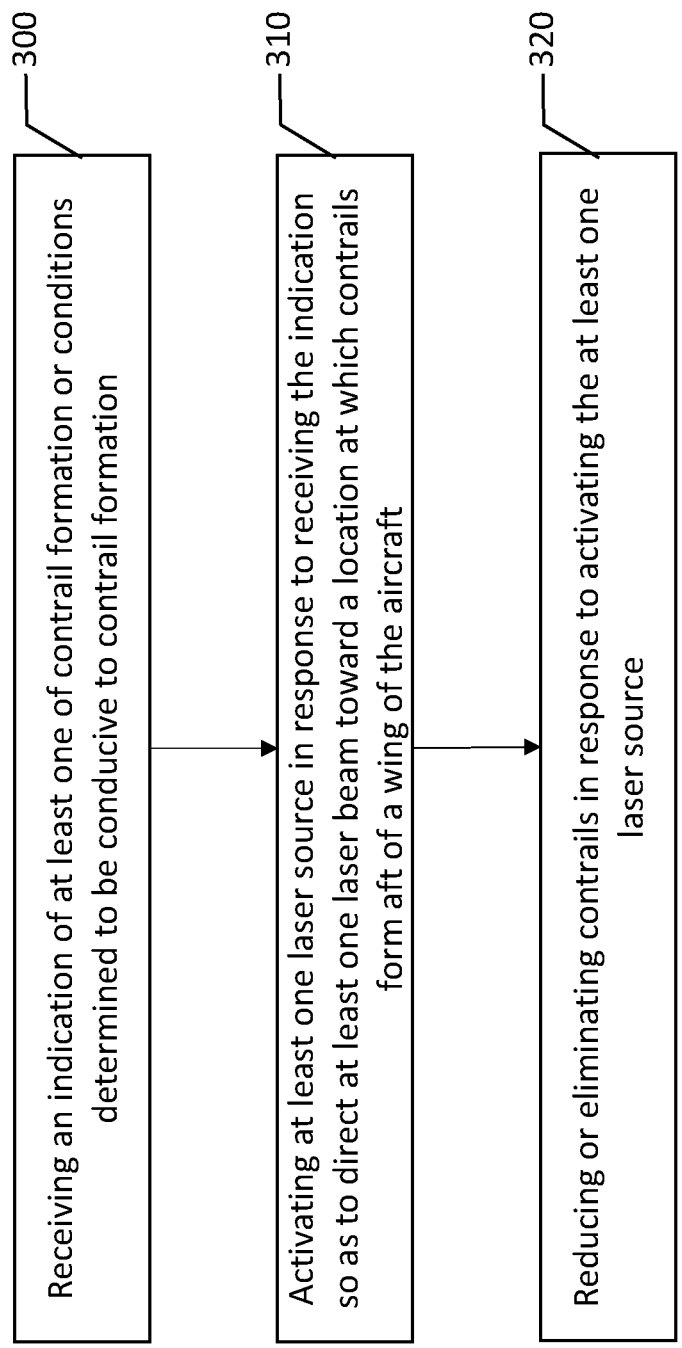
Figure 10:
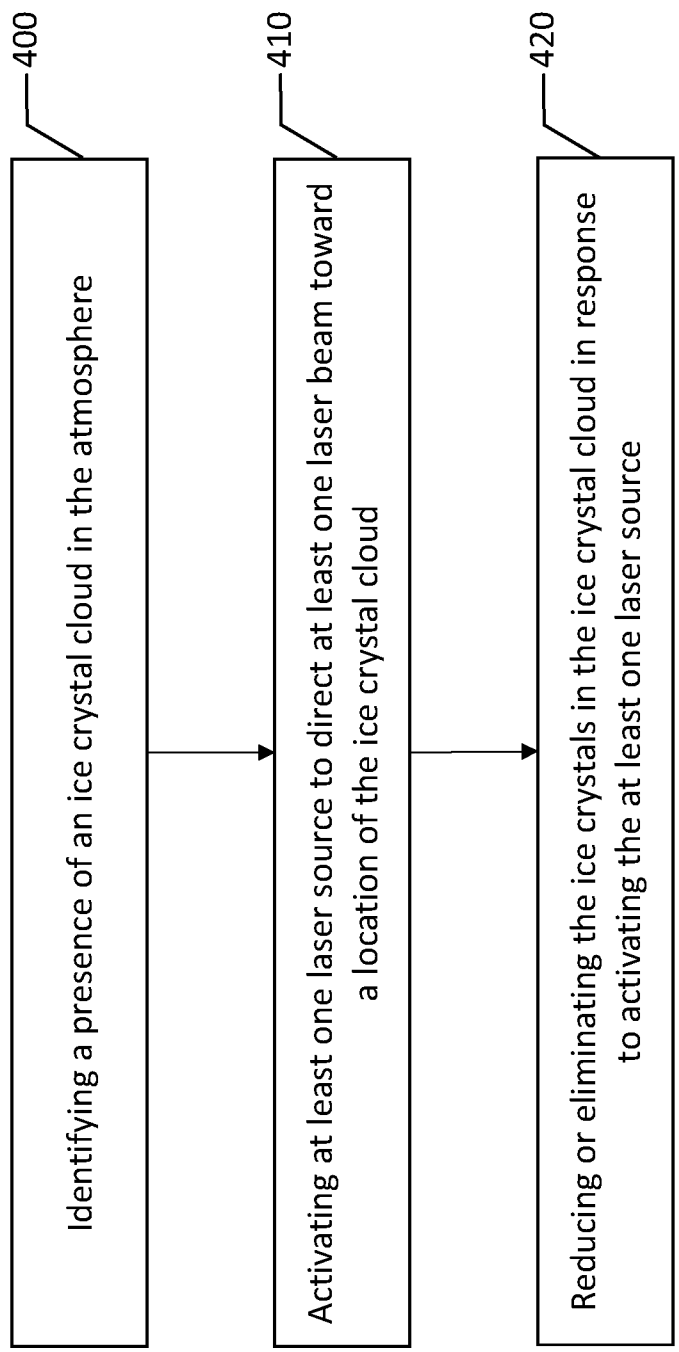

Having thus described certain example embodiments of the present disclosure in general terms, reference will hereinafter be made to the accompanying drawings which are not necessarily drawn to scale, and wherein:

FIG. 1 illustrates a system for reducing or eliminating contrails according to an example embodiment of the present disclosure;

FIG. 2 depicts phases of contrail formation according to an example embodiment of the present disclosure;

FIG. 3 illustrates a laser beam interacting with the formation of a contrail according to an example embodiment of the present disclosure;

FIG. 4 illustrates an arrangement of a bank of lasers positioned around a jet engine of an aircraft according to an example embodiment of the present disclosure;

FIG. 5 illustrates an example embodiment in which a first laser beam is emitted from a first location at a first angle with respect to an axis through the jet engine while a second laser beam is emitted from a second location at a second angle with respect to the axis through the jet engine;

FIG. 6 illustrates a plurality of laser beams emanating from positions along wings of an aircraft according to example embodiments of the present disclosure;

FIG. 7 illustrates the plurality of laser beams emanating from positions along wings of an aircraft as in FIG. 6 where the laser beams are steered to dynamically adjust the direction of the laser beams;

FIG. 8 illustrates a plurality of laser beams emanating from positions along wings of an aircraft forming distrails according to an example embodiment of the present disclosure;

FIG. 9 illustrates a flowchart of a method for reducing or eliminating contrails according to an example embodiment of the present disclosure; and FIG. 10 illustrates a flowchart of a method for reducing or eliminating ice crystals in an ice crystal cloud according to an example embodiment of the present disclosure.

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

As air travel becomes more accessible and the number of aircraft and available flights increases, air traffic commensurately increases. Further, shipping of goods by plane has become widely available and cost effective such that cargo aircraft further adds to air traffic. With the majority of air travel and air cargo flying on jet aircraft at altitudes above 25,000 feet, the likelihood and prevalence of contrail formation increase. In some circumstances or environments, a reduction or elimination of contrails may be desirable. Embodiments provided herein provide an apparatus and system for reducing or eliminating contrails formed by an aircraft as it travels through the sky, and more particularly, to disrupting formation of contrails and altering the electromagnetic properties of already-formed contrails through use of one or more lasers.

FIG. 1, a system 100 is provided to reduce or eliminate contrails. As shown, the system includes a controller 102, which may be configured in various manners and, as such, may be embodied as a circuit board, a control module, a computer, a computer workstation, a server or the like. Regardless of the manner in which the controller 102 is embodied, the controller of an example embodiment includes or is otherwise associated with processing circuitry 132, memory 134, and optionally a user interface 136 and a communication interface 138 for performing the various functions herein described. The processing circuitry 132 may, for example, be embodied as various means including one or more microprocessors, one or more coprocessors, one or more multi-core processors, one or more controllers, one or more computers, various other processing elements including integrated circuits such as, for example, an ASIC (application specific integrated circuit) or FPGA (field programmable gate array), or some combination thereof. In some example embodiments, the processing circuitry 132 is configured to execute instructions stored in the memory 134 or otherwise accessible to the processing circuitry. These instructions, when executed by the processing circuitry 132, may cause the controller 102 and, in turn, the system 100 to perform one or more of the functionalities described herein. As such, the controller 102 may comprise an entity capable of performing operations according to an example embodiment of the present disclosure while configured accordingly. Thus, for example, when the processing circuitry 132 is embodied as an ASIC, FPGA or the like, the processing circuitry and, correspondingly, the controller 102 may comprise specifically configured hardware for conducting one or more operations described herein. Alternatively, as another example, when the controller 102 is embodied as an executor of instructions, such as may be stored in the memory 134 the instructions may specifically configure the processing circuitry and, in turn, the controller 102 to perform one or more algorithms and operations described herein.

The memory 134 may include, for example, volatile and/or non-volatile memory. The memory 134 may comprise, for example, a hard disk, random access memory, cache memory, flash memory, circuitry configured to store information, or some combination thereof. In this regard, the memory 134 may comprise any non-transitory computer readable storage medium. The memory 134 may be configured to store information, data, applications, instructions, or the like for enabling the controller 102 to carry out various functions in accordance with example embodiments of the present disclosure. For example, the memory 134 may be configured to store program instructions for execution by the processing circuitry 132.

The user interface 136 may be in communication with the processing circuitry 132 and the memory 134 to receive user input and/or to provide an audible, visual, mechanical, or other output to a user. As such, the user interface 136 may include, for example, a user interface by which an operator can manually activate contrail reduction and elimination mechanisms as described herein. Other examples of the user interface 136 include a keyboard, a mouse, a joystick, a microphone and/or other input/output mechanisms.

The communication interface 138 may be in communication with the processing circuitry 132 and the memory 134 and may be configured to receive and/or transmit data. The communication interface 138 may include, for example, one or more antennas and supporting hardware and/or software for enabling communications with a wireless communication network. Additionally or alternatively, the communication interface 138 may include the circuitry for interacting with the antenna(s) to cause transmission of signals via the antenna(s) or to handle receipt of signals received via the antenna(s). In some environments, the communication interface 138 may alternatively or also support wired communication.

Computing device 140 may be embodied by any number of devices such as mobile computing devices (e.g., laptop computers, tablet computers, mobile or smart phones, etc.) or may be fixed computing devices such as a desktop computer, workstation, aircraft computing device (e.g., one or more aircraft system computing devices) or the like. The computing device 140 may be configured to provide information or external control to the controller 102 for reducing or eliminating contrails as described herein. The controller 102, autonomously or under control of the computing device 140, can control devices such as a laser source 192 or the like to reduce or eliminate contrails. The computing device 140 may be co-located with the controller 102 or may be remote from the controller. Further, the computing device 140 may be carried on an aircraft including the controller 102, whereby a user of the computing device 140 may be able to provide instruction to the computing device which in-turn provides the instruction to the controller 102 to control the devices such as the laser source 192 relative to contrail reduction and elimination.

The system of an example embodiment includes one or more sensors 142 that may provide data or information to facilitate control of the laser source 192. For example, the sensors 142 may sense environmental conditions including temperature, pressure, or the like such that the sensors or the controller 102 can determine if conditions are conducive to contrail formation. The controller 102 may process the sensor data from sensors 142 to determine when contrail formation is likely, or the controller 102 may receive an indication that contrail formation is likely. The sensors may include optical sensors that determine visually when contrails are being formed or may receive feedback in the form of scattered light from a contrail to establish that contrails are being formed.

Contrails can be produced by aircraft as they fly at relatively high altitudes, such as above 30,000 feet. Contrails are typically linearly formed clouds formed of ice particles that form in the wake of aircraft. Contrails are formed through two primary formation processes, both of which are byproducts of aircraft travel. The first formation process is through pressure changes that result from the aircraft traveling through the atmosphere. Aircraft wings function by providing lift due to pressure differences imparted by the shape of the wing as it passes through the air. Air pressure changes through wingtip vortices or the air over the entire wing can cause low pressure regions to form behind the wings. Low pressure regions trailing aircraft structures such as wings can cause droplets of water to condense from the atmosphere. These droplets may freeze due to the cold temperatures at altitude and form contrails of linear clouds trailing the aircraft wings. Contrails may also be formed through water vapor produced in aircraft engine exhaust as a byproduct of combustion. The water vapor exiting the jet engine can freeze and form contrails of linear clouds trailing the aircraft engines.

FIG. 2 illustrates an example process of contrail formation where atmospheric air enters the jet engine 180 along arrow 182. The exhaust exits the jet engine including aerosol particles on the order of 10 nanometers in size as shown at a first phase 184 of contrail formation. This occurs in approximately the first tenth of a second after the exhaust leaves the jet engine. In the next second or so, the aerosol particles form water droplets of about 100 nanometers in size as shown at a second phase 186 of contrail formation. Due to the temperatures at altitudes, particularly the cold temperatures found above 30,000 feet of altitude, the water droplets freeze over the following ten seconds or so as shown at a third phase 188 of contrail formation forming ice crystals of around 1000 nanometers that collectively form the contrails. Embodiments described herein disrupt this process to reduce or preclude the formation of the ice crystals, which reduces or precludes the formation of the contrails.

FIG. 3 illustrates the aerosol particles of the first phase 184 exiting the jet engine 180. However, a pulsed laser shown as laser cone 190 emanating from laser source 192 is directed along the path of the exhaust to disrupt the formation of the water droplets. This disruption largely prevents the particles activating into water droplets (shown as second phase 186 in FIG. 2) which interrupts and stops the formation of contrails. Should some droplets of water still form, the pulsed laser cone 190 warms the water droplet to prevent freezing of the water droplets, or if freezing has already occurred or begun, the pulsed laser of laser cone 190 melts the frozen crystal thereby breaking up the potential formation of the contrail. Beyond warming of ice crystals using a laser, certain embodiments employ a laser to change the electromagnetic properties of the contrail such that it reflects more sunlight and/or is more transparent to infrared radiation, for example a wavelength of 10 um. In other words, although the laser may not alter the diameter and length of the contrail, the electromagnetic properties of the contrail are changed. This can be accomplished by using the pulsed laser to break the ice crystals into small fragments that are less effective at reflecting thermal radiation (i.e. more transparent), which in some embodiments is centered at a wavelength of about 10 um (10 micrometers). Raleigh scattering and Mie scattering relate to the phenomenon of scattering of radiation based on particle size, where scattering decreases as particle size decreases. If water and ice particles are kept to 100 nm (100 nanometers) or less, whether they are precluded from forming into ice or fragmented, the ability of these particles to reflect the 10 um wavelength of thermal radiation would be drastically reduced As detailed above, contrails can also form from low pressure zones proximate the trailing edges of wings or near wingtips. Pulsed lasers, such as the pulsed laser of laser cone 190 of FIG. 3, can disrupt the formation of ice crystals in the same manner as used for disrupting contrail formation from the exhaust. The formation process from a low pressure zone is similar, such that disruption using the laser has the same net effect of stopping the contrail from forming. While embodiments are described above with a single laser, embodiments can employ multiple lasers at different wavelengths. For instance, two lasers operating at two different wavelengths could function with one laser to ionize the particles and the other laser to heat, melt, or fragment the contrail particles. The laser used to ionize the particles have a shorter wavelength than the wavelength of the laser used to heat or melt the contrail particles due to ionization energies being relatively larger than the rotational and vibrational transition energies of molecules. In this manner, one laser functions as a catalyst. Further, one laser beam can be pulsed, while the other is a continuous wave. Optionally, the lasers could be pulsed at different frequencies. An example of a high power pulsed laser (50 J) is a $Nd^{3+}$: (Neodymium) glass laser at 1053 nm. Examples of continuous wave laser types that may be employed include: 1) a $CO_2$ (Carbon Dioxide) gas laser at 10.6 um since this laser is powerful, efficient (10%), and has a wavelength that is heavily absorbed in water and ice, 2) the $Yb^{3+}$: (Ytterbium) silica fiber laser at 1075 nm since this laser too is efficient (20%) and powerful with an output of >1.5 kW, and 3) a $Er^{3+}$: (Erbium) silica fiber laser at 1550 nm. In any of these cases, multiple lasers could be employed for each contrail to provide sufficient power to the contrails, particularly with the $Er^{3+}$: silica fiber laser as it only outputs about 100 Watts. However, configuring these fiber lasers is feasible given that they are fiber lasers. FIG. 4 illustrates an example implementation of a multiple-laser configuration where the lasers employed are fiber lasers that conduct laser beams through the fibers to be emitted from locations remote from the laser source. As laser technology improves over time, these lasers will become higher power and more energy efficient.

The properties of contrails formed by an aircraft may differ based on variables such as the aircraft speed, altitude, humidity, temperature, etc. Further, properties of the contrail may be determined by example embodiments described herein, such as by measuring reflectivity of a contrail, formation position of the contrail, contrail density, or the like. The system 100 of example embodiments may use one or more sensors (e.g., sensor(s) 142 of FIG. 1) to detect various properties of the aircraft, the environment, and the contrails formed. Sensors may include LiDAR (Light Distancing and Ranging), radar, ultrasonic sensors, thermal imaging sensors, image sensors, or the like. Embodiments described herein may determine, based on real-time environmental data, aircraft data, and/or detected properties of a formed contrail, an optimal laser wavelength, power, pulse width, and position at which the laser intersects the contrail to provide the most effective and efficient contrail reduction. Embodiments may employ a non-deterministic design approach such as the Taguchi method to establish the most efficient contrail reduction strategy employing available lasers and positioning elements that can direct the lasers.

As shown in FIG. 4, a bank of lasers 191 (including a plurality of laser sources, such as laser source 192) can be housed within a wing 193 of an aircraft with fibers 195*a-c* routed to locations 197*a-c* best suited for contrail reduction and elimination of a contrail 187. These positions include routing the fibers 195*a-c* to locations 197*a-c* on a jet engine 180 such that they can be directed aft of the jet engine to form overlapping laser beams 196*a-c* in the location where a contrail would generally form. In particular, fiber 195*a* is routed to location 197*a* forming laser beam 196*a*, fiber 195*b* is routed to location 197*b* forming laser beam 196*b*, and fiber 195*c* is routed to location 197*c* forming laser beam 196*c*. The bank of lasers 191 may include the lasers described above, or any laser suitable to perform the functions described herein. The lasers positioned around the exit of the jet engine 180 may operate at different frequencies as described above. Such an example includes, for instance, a laser cone emanating from location 197*a* having a first wavelength and a laser cone emanating from location 197*b* having a second wavelength, where the second wavelength is different from the first wavelength.

As described above, lasers are be used to disrupt the formation of contrails and to eliminate contrails formed or forming. Embodiments can optionally modify a contrail to render the contrail less effective at reflecting infrared electromagnetic waves. Embodiments can modify the electromagnetic properties of a contrail to affect the infrared wave interference or infrared reflective properties or scattering properties of a contrail.

The ice crystals formed during contrail formation scatter light and radiation. The type of scattering that is most prevalent from the particles is largely dependent upon the size of the particles. Mie scattering of light is prominent with particles of larger size, such as ice crystals or dust, while Rayleigh scattering is more prominent with smaller particles since Rayleigh scattering favors short wavelengths. The larger particle size formed during contrail formation, such as ice crystals formed at the third phase 188 of FIG. 2, results in a higher proportion of Mie scattering from the contrails. An infrared emission having a wavelength of about 10 microns would result in a high proportion of Mie scattering through a contrail. Because of the relationship between a particle size and the wavelengths that the particle will scatter is inversely proportional, reducing the scattering is possible through either increasing the wavelength of the radiation impinging upon the particle, or reducing the particle size. Since the radiation wavelengths passing through the atmosphere are not controllable, it is desirable to reduce the particle size of particles in a contrail to reduce overall scattering from the contrail, and particularly the Mie scattering of a contrail.

Embodiments provided herein use lasers to reduce the particle sizes of particles in a contrail and to disrupt the formation of larger particles in order to reduce the scattering ability of contrails which reduces both their visibility and their effect on scattering atmospheric radiation. Pulsed lasers may be employed as a pulsed laser has a relatively high energy density relative to a continuous wave (CW) laser. A CW laser that encounters an ice crystal causes the ice crystal to increase in temperature; however, the ice crystal will begin to emit its own infrared signature. Conversely, a pulsed laser encountering an ice crystal does not provide sufficient time for the ice crystal to emit its own infrared signature such that more energy is consumed by the ice crystal, warming the ice crystal and melting or sublimating the ice crystal to reduce its size or eliminate the ice crystal, and therefore the reducing the scattering.

Mie scattering is polarization dependent, such that elongated ice crystals may respond to a laser based on whether the polarization aligns with the ice crystal. Ice crystals forming in the atmosphere at substantial speed behind a jet engine may form in an elongated manner due to the wind speed, such that polarization of a laser used to disrupt crystal formation or to heat formed ice crystals may be important. Ice crystals may form or become oriented with an anisotropic effect such that they have a preferred alignment. This anisotropic effect may be capitalized on through the use of a polarized laser that is of an optimal polarization for causing ice crystals formed along the preferential alignment or the determined alignment of the ice crystals to better absorb the energy from the polarized laser, thereby rendering the laser more efficient in reducing the size of the ice crystals.

The absorption, by an ice crystal or water droplet, of energy from a laser occurs when the frequency of an infrared photon matches a molecular bond frequency (i.e., resonant frequency). The photon is absorbed by the bond which results in the promotion of the bond electron to an excited state. The result is: a weakening of the bond during the excitation period, the potential for a new bond to form during the electron's excited state, or during relaxation, the electron releases a phonon which raises the temperature of the molecule and its surrounding molecules (i.e., molecular vibrations) which raises the temperature of the ice crystal or water droplet, which results in disruption of formation of an ice crystal or reduction in size of a formed ice crystal. The lasers described herein, such as the laser that produces the laser cone 190 of FIG. 3, directed to the location of a contrail or where a contrail forms, reduce or eliminate the contrail through disruption of the ice crystal formation process and/or melting of ice crystals already formed.

In order to maximize the effect of the lasers on the contrails, it is desirable to have a significant interaction length with the contrail, where the interaction length is the length of the overlap between a laser beam (e.g., laser cone 190) with the contrail. The laser beam is configured to intercept water droplets and/or ice crystals along the interaction length for contrail reduction or elimination as described herein. FIG. 4 illustrates an interaction length between where the laser beams 196a-c begins to interact with the contrail 187 at position 170 until the beam ceases to interact with the contrail at position 172 due to a distance being too great for the laser beams 196a-c to be effective. The interaction length is between position 170 and position 172 in the illustration of FIG. 4. Other example interaction lengths are possible as well. For instance, in an example, the interaction length of a laser beam corresponds to where the laser beam begins to interact with the contrail 187 until the point where the laser beam and contrail 187 diverge. In such an example, the interaction length of laser beam 196a can correspond to where the laser beam 196a begins to interact with the contrail 187 at position 170 until where the laser beam 196a and contrail 187 diverge. To maximize the interaction length, it is desirable to position a laser proximate to where the contrail is formed. In the case of contrails formed from the exhaust from a jet engine, positioning one or more lasers at an exit of the jet engine or around the exit of the jet engine will provide the greatest interaction length. FIGS. 3 and 4 illustrate a configuration where laser beams are emitted from a position near the exhaust exit of a jet engine. As shown in FIG. 4, the bank of lasers 191 housed within the wing 193 with fibers 195a-c routed to locations 197a-c, respectively, around the jet engine 180 from which the laser beams 196a-c are emitted.

According to some embodiments, laser beams 196-c impinge upon the location where contrails form at different angles, so as to reach the contrail at different distances from the exhaust of the jet engine 180 and/or to interact with the contrail at different portions or zones of the contrail. FIG. 5 illustrates an example embodiment in which a first laser beam 196a is emitted from a first location 197a at a first angle with respect to an axis 181 extending through the jet engine 180. In this illustrated example, the first laser beam 196a reaches the axis 181 along which the contrail 187 forms at a short distance (e.g. 20 feet) behind the jet engine 180. Conversely, a second laser beam 196b is emitted from a second location 197b at a second angle with respect to the axis 181 through the jet engine 180. In this illustrated example, the second laser beam reaches the axis 181 at a relatively longer distance (e.g., 40 feet) behind the jet engine 180. These two differing angles of impingement of the two laser beams can be used to interact with the contrail 187 at different positions where the contrail formation is in different phases as shown in FIG. 2.

FIG. 6 illustrates an aircraft 110 including a plurality of laser sources 192, with each laser source producing a laser beam 194 forming a laser cone aft of the aircraft 110 to a location 189 where contrails form and configured to break up contrail formation by disrupting the contrail formation process, thereby precluding the formation of contrails. While the illustrated embodiment of FIG. 6 may be implemented to reduce and/or eliminate contrails formed from jet engine exhaust or from low pressure zones, lasers of some embodiments are positioned in various positions on an aircraft to accomplish this goal. For example, a laser source or bank of lasers 191 with fibers 195a-c may be implemented in a position proximate a wing tip, lasers or a bank of lasers 191 with fibers 195a-c may be implemented in a position as depicted in FIG. 4 with lasers emitted from one or more locations on a jet engine. Optionally, the laser or bank of lasers may be implemented on a tail 198 of an aircraft which place the laser sources downstream of the initiation of the contrails and at a position where they are further into development. Example embodiments benefit from lasers or laser sources positioned proximate where contrails form from on an aircraft 110 as the absorption coefficient of the laser beam may be low, directing the laser beam parallel to the formation path of the contrail such that the interaction length or overlap between the laser beam path and the contrail formation path is large, compensating for low absorption. This configuration can improve the efficiency of the laser beam functionality through a lower power consumption than would be required if the overlap between the laser beam path and the contrail formation path is lower. Optionally, the laser beams 194 are steerable or can be aimed at different locations. In an example, steering or adjusting the laser beams allows for selectively controlling which portion or zone of the contrail with which the laser beams interact. For instance, within examples, the laser beams can be dynamically swept to cover a larger area. For example, a cone of the laser beam 194 of an example embodiment is be narrower than a contrail. In such a case, the cone of the laser beam 194 is swept dynamically to cover the location 189 behind the aircraft 110 where contrails form. Within examples, the laser beams are steerable to dynamically move an aim of the laser beam responsive to an indication of a location where contrails have formed. FIG. 7 illustrates the laser beams 194 steered in directions not parallel to a path of flight of the aircraft 110. The laser beams 194 of the illustrated embodiment are steered and sweep a path behind an aircraft where it may improve the reduction or elimination of contrails or contrail formation.

While a long interaction length increases the interaction between the laser beam and the contrail, certain embodiments employ lasers positioned such that the beams from these lasers impinge upon the formed contrails at specific positions. Referring back to FIG. 4, a laser beam 196a can be positioned to impinge upon the forming contrail 187 where the aerosol particles exit the jet engine 180 at first phase (e.g., first phase 184 of FIG. 2, such as at around 20 feet from the jet engine 180) to disrupt formation of water droplets (e.g., second phase 186 of FIG. 2), while a second laser beam 196b can be positioned to impinge upon the forming contrail where ice crystals are formed (e.g., third phase 188 of FIG. 2, such as at 40 to 60 feet from the jet engine 180) to melt and reduce the size of the ice crystals. Positioning a laser to interact with the length of the contrail has the potential to reduce the effectiveness of the laser beam once it reaches the position at which ice crystals are forming.

As the method for reducing or eliminating contrails as described above requires energy to power the lasers, example embodiments selectively choose, such as by controller 102, when to operate the lasers based on when conditions are conducive to contrail formation or when contrail formation is confirmed. For example, if contrail formation occurs only above a predefined altitude threshold (e.g., 30,000 feet) and below a predefined temperature threshold (e.g., −30° F.), the lasers or laser sources are controlled (e.g., via controller 102) to operate only under these conditions. The controller 102 of example embodiments is configured to cause the laser source to activate in response to receiving an indication of at least one of contrail formation or conditions determined to be conducive to contrail formation. In an example, the indication is sensor data received from sensor(s) 142 that that the controller determines is associated with conditions that are conducive to contrail formation. In an example, the controller 102 is configured to cause the laser source to activate in response to conditions determined by the controller to be conducive to contrail formation. According to some embodiments, an image sensor positioned to capture an image of where contrails would normally form is configured to be used to confirm when contrails are present, and the controller of such embodiments is configured to only operate the laser sources once contrail formation is confirmed. Further, the laser beam of an example embodiment is periodically pulsed and scattered light can be measured, such as by sensors 142, to determine contrail formation and density. If the scattered light measured by a sensor reaches a particular threshold, a contrail is confirmed, and the laser source 192 is turned on at full power or at a power level sufficient to reduce or eliminate the contrail as described above to bring down the scattered light measured by the sensors 142.

Contrails may be persistent or may rapidly dissipate. If humidity is low in the atmosphere, a contrail may be short-lived (e.g., less than 10 minutes). Ice particles from the contrails will evaporate into the surrounding atmosphere. If humidity is relatively high, conditions may be conducive to persistent contrail formation such that contrails may be persistent with persistent ice crystal formation and extend for miles in length while spreading hundreds of yards in width and height. Persistent contrails include contrails that form and remain visible for 30 minutes or more. An example embodiment described herein monitors conditions beyond temperature and altitude to include humidity such that a distinction can be made between whether conditions suggest rapidly dissipating contrails or persistent contrails. If conditions indicate rapidly dissipating contrails, contrail mitigation through use of the lasers may be avoided. If conditions indicate that contrails will be persistent, contrail mitigation methods are employed using lasers to disrupt the contrail formation process to reduce or eliminate contrail formation. Optionally, if conditions suggest contrail persistence may be of intermediate duration (e.g., 5 minutes to 30 minutes), use of contrail mitigation techniques described herein will be determined based on other factors, such as energy requirements weighed against the benefits of the contrail mitigation.

While the aforementioned embodiments provide a system for an aircraft for reducing or eliminating contrails from the same aircraft, embodiments provided herein may reduce or eliminate contrails from other aircraft, or reduce or eliminate ice crystals formed in the atmosphere from other sources. Ice crystals may form in the atmosphere from a variety of sources and may be dispersed over wide areas in some circumstances. For instance, ice crystals may form naturally in the atmosphere due to natural atmospheric conditions (e.g., pressure, temperature, humidity, aerosol content, etc.). These ice crystals scatter light and infrared waves through Mie scattering as described above. It may be desirable to reduce the presence of these ice crystals in the atmosphere, and example embodiments provided herein can accomplish this, such as through the use of system 100 of FIG. 1.

According to one embodiment, an aircraft may encounter contrails formed by another aircraft, and reduce the contrails to reduce their scattering properties. An aircraft may fly parallel to the existing contrails and may have lasers that are angled or steerable to interact with the existing contrails. An aircraft including such a system for reducing or eliminating ice crystals in the atmosphere may use sensors, as described above, to detect the presence of ice crystals, such as in an existing contrail, using backscatter or other techniques. The system of some embodiments uses the detection to identify a location of the existing contrail, such as through the use of LiDAR, and to guide a laser based on the detected location of the existing contrail. Embodiments employ the system for reducing or eliminating the ice crystals in response to a density of the ice crystals being above a predetermined density. This is determined, for example, based on the amount of scattering of light determined by a sensor. An example of a predetermined density includes at least 75% of light scattering, which may be established by a sensor (e.g., sensors 142) projecting light onto the ice crystals and measuring the feedback in the form of scattered light.

According to some embodiments, an aircraft may encounter ice crystals formed by other means. For instance, nuclear power plants may generate steam that can billow into the atmosphere where the water droplets can freeze and become a source of Mie scattering. An aircraft flying near such emissions may be routed through the ice crystals for purposes of reducing or eliminating the ice crystals, thereby reducing the resultant Mie Scattering. FIG. 8 illustrates such an example embodiment where an aircraft 110 flies through an ice crystal cloud 205 and uses laser cones 194 produced from laser sources 192 to reduce or eliminate the ice crystals in the form of a dissipation trail (also referred to herein as a "distrail") 210. The laser sources 192 of some embodiments are manually enabled to produce the laser cones 194, or the laser sources 192 of certain embodiments are enabled based on detection of the ice crystal cloud 205, such as through detection means described above.

While aircraft of example embodiments are configured to eliminate ice crystal clouds and contrails as they encounter them, embodiments optionally route aircraft to or through specific locations where such ice crystal clouds or contrails are present or prevalent. With reference to the example above, if a nuclear power station is known to produce ice crystal plumes in the atmosphere under conducive conditions, an aircraft may be routed through the area where such plumes are known to likely exist on a path to the destination of the aircraft. Similarly, as it is important for solar energy to reach solar cells of a solar farm for producing energy, aircraft employing systems for reducing or eliminating contrails may be routed over such solar farms to reduce or eliminate contrails or clouds of ice crystals formed over or near such solar farms to maximize efficiency of those solar farms. Optionally, an aircraft of an example embodiment is mission-specific for reducing or eliminating contrails and clouds of ice crystals. Such an aircraft may seek out contrails and clouds of ice crystals, detecting them through the detection mechanisms described above.

Embodiments provided herein establish whether it is prudent to perform contrail and ice crystal reduction based on the context of the contrail or ice crystals present. For example, if there exists a 100 meters thick layer of ice crystals over a solar farm, it may be determined that reduction or elimination will be insufficient and is not warranted. However, if the layer of ice crystals over a solar farm is only five meters thick, it may merit use of the system described herein to reduce or eliminate the ice crystals and reduce the degree of scattering. Similarly, if the thickness or size of a cloud layer of ice crystals is ten meters thick, and the scattering of infrared energy in the cloud occurs primarily within the first one meter of thickness, an attempt to reduce or eliminate the cloud of ice crystals may not be efficient. However, if a thickness of a cloud of ice crystals is ten meters thick, and the scattering of infrared energy in the cloud primarily occurs over the first nine meters of thickness, reduction or elimination of the ice crystals of the cloud may be worthwhile as it may reduce the scattering effect of the cloud.

FIGS. 9 and 10 illustrates flowcharts of a methods according to an example embodiments of the present disclosure. It will be understood that each block of the flowcharts, and combinations of blocks in the flowchart, may be implemented by various means, such as hardware, firmware, processor, circuitry, computing device, and/or other devices associated with execution of software including one or more computer program instructions. For example, one or more of the procedures described above are embodied by computer program instructions in certain embodiments. In this regard, the computer program instructions which embody the procedures described above are stored by the memory 134 of a controller 102 of a system 100 employing an embodiment of the present disclosure and executed by the processing circuitry 132 of the system 100. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions are optionally stored in a computer-readable memory that directs a computer or other programmable apparatus to function in a particular manner, such that the instructions stored in the computer-readable memory produce an article of manufacture the execution of which implements the function specified in the flowchart blocks. The computer program instructions of certain embodiments are loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

As shown in FIG. 9, a method for disrupting formation of contrails 187 and altering the electromagnetic properties of already-formed contrails through use of one or more laser sources 192 is shown. As shown at 300, an indication is received of at least one of contrail formation or conditions determined to be conducive to contrail formation. At least one laser source 192 is activated in response to receiving the indication so as to direct at least one laser beam 196 toward a location at which contrails form aft of a wing 193 of the aircraft 110 as shown at 310. The contrails are reduced or eliminated in response to activating the at least one laser source 192 as shown at 320.

FIG. 10 illustrates a method for reducing or eliminating ice crystals in an atmosphere. The depicted method includes identifying a presence of an ice crystal cloud in the atmosphere at 400. At least one laser source 192 is activated at 410 to direct at least one laser beam 196 toward a location of the ice crystal cloud 205. The ice crystals in the ice crystal cloud 205 are reduced or eliminated in response to activating the at least one laser source 192 as shown at 420.

Accordingly, blocks of the flowcharts support combinations of means for performing the specified functions and combinations of operations for performing the specified functions for performing the specified functions of communicating a message from an aircraft. It will also be understood that one or more blocks of the flowcharts, and combinations of blocks in the flowcharts, can be implemented by special purpose hardware-based computer systems which perform the specified functions, or combinations of special purpose hardware and computer instructions. For example, one or more blocks of the flowcharts and combinations of blocks in the flowcharts can be performed by an apparatus for communicating a message from an aircraft including processing circuitry and at least one non-transitory memory including computer program code instructions. The computer program code instructions of an example embodiment are configured to, when executed, perform the specified functions and combinations of operations illustrated in the blocks of the flowcharts.

In some embodiments, certain ones of the operations above are modified or further amplified. Furthermore, in some embodiments, additional optional operations are included. Modifications, additions, or amplifications to the operations above may be performed in any order and in any combination. While the system 100 of example embodiments are integrated into an aircraft 110 when the aircraft is manufactured, certain embodiments are retrofitted onto existing aircraft. In an example retrofit embodiment, the controller 102 is integrated into the control systems of the aircraft while one or more laser sources 192 are positioned on a wing 193 or on a jet engine 180 of an aircraft. A bank of lasers, such as the bank of lasers 191 of FIG. 4 is optionally installed remotely from locations (e.g., locations 197*a-c*) such that there is flexibility in the location of installation of laser sources and controllers in a retrofit system of example embodiments.

Further, the disclosure comprises embodiments according to the following clauses:

Clause 1. A system for reducing or eliminating contrails behind an aircraft (110), the system comprising: a controller (102); and a laser source (192), wherein the controller is configured to, in response to receiving an indication of at least one of contrail formation or conditions determined to be conducive to contrail formation, cause the laser source to emit one or more laser beams (196) toward a location (189) behind the aircraft where contrails form under conditions conducive to contrail formation.

Clause 2. The system of Clause 1, wherein the laser source (192) is directed toward a location (189) behind the aircraft (110) where contrails (187) form under conditions conducive to contrail formation.

Clause 3. The system of Clause 1 or Clause 2, wherein conditions determined by the controller (102) to be conducive to contrail formation comprise a temperature below a predefined temperature threshold and an altitude above a predefined altitude threshold.

Clause 4. The system of any of Clauses 1 to 3, wherein the controller (102) is configured to cause the laser source (192) to activate in response to conditions determined by the controller to be conducive to persistent contrail formation.

Clause 5. The system of any of Clauses 1 to 4, wherein the laser source (192) comprises a bank of fiber lasers (191), wherein fiber lasers of the bank of fiber lasers are positioned to direct laser beams (196) in a direction aft of a wing (193) of the aircraft (110).

Clause 6. The system of any of Clauses 1 to 4, wherein the laser source (192) comprises a bank of fiber lasers (191), wherein the one or more laser beams emitted from the laser source (192) are conducted through one or more fibers (195) to one or more locations (197) proximate an exhaust exit of a jet engine (180).

Clause 7. The system of any of Clauses 1 to 6, wherein the one or more laser beams (196) are steerable to dynamically move an aim of the one or more laser beams in response to an indication of a location (189) where contrails have formed.

Clause 8. The system of Clause 7, wherein the one or more laser beams (196) are swept to cover the location (189) behind the aircraft where contrails form under conditions conducive to contrail formation.

Clause 9. The system of any of Clauses 1 to 8, wherein the one or more laser beams (196) comprise a first laser beam (196a) and a second laser beam (196b), wherein the first laser beam (196a) is configured to ionize particles of a contrail, and the second laser beam (196b) is configured to heat particles of the contrail.

Clause 10. The system of Clause 9, wherein the first laser beam (196a) and the second laser beam (196b) overlap.

Clause 11. The system of Clause 10, wherein the first laser beam (196a) intersects a formed contrail at a first distance aft of a jet engine (180) of the aircraft (110), and the second laser beam (196b) intersects the formed contrail at a second distance aft of the jet engine (180) of the aircraft (110), different than the first distance.

Clause 12. The system of any of Clauses 1 to 11, further comprising at least one sensor (142) configured to detect at least one of contrail formation or conditions conducive to contrail formation, wherein the laser source (192) caused to emit one or more laser beams (196) is caused by the controller to adjust the one or more laser beams in response to sensor data from the at least one sensor.

Clause 13. The system of any of Clauses 1 to 12, wherein the laser source (192) caused to emit one or more laser beams (196) is caused by the controller to adjust polarization of the one or more laser beams in response to a determined alignment of ice crystals in a formed contrail.

Clause 14. An aircraft comprising the system of any of Clauses 1 through 13.

Clause 15. A method for reducing or eliminating contrails behind an aircraft (110) comprising: receiving an indication of at least one of contrail formation or conditions determined to be conducive to contrail formation; activating at least one laser source (192) in response to receiving the indication so as to direct at least one laser beam (196) toward a location (189) at which contrails form aft of a wing (193) of the aircraft (110); and reducing or eliminating contrails in response to activating the at least one laser source.

Clause 16. The method of Clause 15, further comprising: determining conditions proximate the wing (193) of the aircraft (110) conducive to contrail formation; and activating the at least one laser source (192) in response to determining conditions proximate the wing (193) of the aircraft (110) conducive to contrail formation.

Clause 17. The method of Clause 16, wherein determining conditions proximate the wing (193) of the aircraft (110) conducive to contrail formation comprises determining conditions proximate the wing (193) of the aircraft (110) conducive to persistent contrail formation.

Clause 18. The method of Clause 16 or Clause 17, wherein the conditions proximate the wing (193) of the aircraft (110) conducive to contrail formation comprise a temperature below a predefined temperature threshold and an altitude above a predefined altitude threshold.

Clause 19. The method of any of Clauses 15 to 18, wherein the at least one laser source (192) comprises a bank of fiber lasers (191), wherein positioning the at least one laser source (192) such that at least one beam (196) from the at least one laser source (192) is directed to the location (189) at which contrails form aft of the wing (193) of the aircraft comprises positioning at least one fiber laser of the bank of fiber lasers (191) to direct the at least one beam (196) along a path of exhaust from a jet engine (180) of the aircraft.

Clause 20. The method of any of Clauses 15 to 19, wherein reducing or eliminating the contrails in response to activating the at least one laser source (192) comprises at least one of: heating water droplets or ice crystals in the location (189) at which contrails form aft of the wing (193) of the aircraft (110); or fragmenting water droplets or ice crystals in the location (189) at which contrails form aft of the wing (193) of the aircraft (110).

Clause 21. The method of any of Clauses 15 to 20, wherein activating the at least one laser source (192) in response to receiving the indication comprises activating at least one pulsed laser in response to receiving the indication.

Clause 22. The method of any of Clauses 15 to 19, wherein reducing or eliminating the contrails in response to activating the at least one laser source (192) comprises modifying electromagnetic properties of the contrail.

Clause 23. The method of Clause 22, wherein modifying electromagnetic properties of contrails formed by an aircraft (110) in response to activating the at least one laser comprises at least one of: intercepting, with the at least one laser source (192), water droplets or ice crystals in the location (189) at which contrails form aft of the wing (193) of the aircraft (110); or modifying water droplets or ice crystals in the location (189) at which contrails form aft of the wing (193) of the aircraft (110) to reduce infrared reflective properties of the water droplets or ice crystals.

Clause 24. The method of Clause 22 or Clause 23, further comprising positioning the at least one laser source (192) at an exit of a jet engine (180) of the aircraft (110) to form the at least one laser beam (196) along a path of exhaust exiting the jet engine (180) of the aircraft (110).

Clause 25. A method for reducing or eliminating ice crystals in an atmosphere comprising: identifying a presence of an ice crystal cloud (205) in the atmosphere; activating at least one laser source (192) to direct at least one laser beam (196) toward a location of the ice crystal cloud (205); and reducing or eliminating ice crystals in the ice crystal cloud (205) in response to activating the at least one laser source (192).

Clause 26. The method of Clause 25, further comprising: receiving an indication of environmental conditions around an aircraft (110) conducive to formation of ice crystals; and activating the at least one laser source (192) in response to receiving the indication of environmental conditions around the aircraft (110) conducive to ice crystal formation.

Clause 27. The method of Clause 26, wherein receiving the indication of environmental conditions around the aircraft (110) conducive to ice crystal formation comprises receiving an indication of environmental conditions around the aircraft (110) conducive to persistent ice crystal formation.

Clause 28. The method of Clause 26 or Clause 27, wherein environmental conditions around the aircraft (110) conducive to ice crystal formation comprise a temperature below a predefined temperature threshold and an altitude above a predefined altitude threshold.

Clause 29. The method of any of Clauses 26 to 28, further comprising: routing the aircraft (110) through a location where ice crystal formation is likely to occur.

Clause 30. A system for reducing or eliminating contrails behind an aircraft (110), the system comprising: a controller (102); and a laser source (192), wherein the laser source is configured to emit at least one laser beam (196) from at least one location (197) proximate an exhaust exit of a jet engine (180), wherein the controller is configured to, in response to receiving an indication of at least one of contrail formation or conditions determined to be conducive to contrail formation, cause the laser source (192) to emit the at least one laser beam (196) toward a location (189) behind the aircraft where contrails form under conditions conducive to contrail formation.

Clause 31. The system of Clause 30, wherein the laser source (192) comprises a bank of fiber lasers (191), wherein at least one laser beam from the laser source (192) is conducted through at least one fiber (195) to the location (197) proximate the exhaust exit of the jet engine (180).

Clause 32. The system of Clause 30 or Clause 31, wherein the at least one laser beam (196) is steerable to dynamically move an aim of the laser beam in response to an indication of a location (189) where contrails have formed.

Clause 33. The system of Clause 32, wherein the at least one laser beam (196) is swept to cover the location (189) behind the aircraft where contrails form under conditions conducive to contrail formation.

Clause 34. The system of any of Clauses 30 to 33, wherein the at least one laser beam (196) comprises a first laser beam (196a) and a second laser beam (196b), wherein the first laser beam (196a) is configured to ionize particles of a contrail, and the second laser beam (196b) is configured to heat particles of the contrail.

Clause 35. The system of Clause 34, wherein the first laser beam (196a) and the second laser beam (196b) overlap.

Clause 36. The system of Clause 35, wherein the first laser beam (196a) intersects a formed contrail at a first distance aft of a jet engine (180) of the aircraft (110), and the second laser beam (196b) intersects the formed contrail at a second distance aft of the jet engine (180) of the aircraft (110), different than the first distance.

Clause 37. The system of any of Clauses 30 to 36, further comprising at least one sensor (142) configured to detect at least one of contrail formation or conditions conducive to contrail formation, wherein the laser source (192) configured to emit at least one laser beam (196) is configured to adjust the at least one laser beam in response to sensor data from the at least one sensor.

Clause 38. The system of any of Clauses 30 to 37, wherein the laser source (192) configured to emit at least one laser beam (196) is configured to adjust polarization of the at least one laser beam in response to a determined alignment of ice crystals in a formed contrail.

Many modifications and other embodiments of the present disclosure set forth herein will come to mind to one skilled in the art having the benefit of the teachings presented in the foregoing descriptions and the associated drawings. Therefore, it is to be understood that the present application is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A system for reducing or eliminating contrails behind an aircraft, the system comprising:
a controller; and
a laser source comprising a bank of fiber lasers positioned within a wing of the aircraft, the bank of fiber lasers having one or more fibers extending from the laser source to one or more positions around an exit of a jet engine attached to the wing, wherein the controller is configured to, in response to receiving an indication of at least one of contrail formation or conditions determined to be conducive to contrail formation, cause the laser source to emit one or more laser beams from the one or more fibers at the one or more positions around the exit of the jet engine toward a location behind the aircraft where contrails form under conditions conducive to contrail formation, wherein the laser source comprises a first fiber laser generating a first laser beam and a second fiber laser generating a second laser beam, wherein the first laser beam functions as a catalyst, wherein the first laser beam is pulsed and the second laser beam is a continuous wave, and wherein the first laser beam that is pulsed is produced by a high power pulsed laser having a power level of at least 50 joules.

2. The system of claim 1, wherein the laser source is directed toward a location behind the aircraft where contrails form under conditions conducive to contrail formation.

3. The system of claim 1, wherein conditions determined by the controller to be conducive to contrail formation comprise a temperature below a predefined temperature threshold and an altitude above a predefined altitude threshold.

4. The system of claim 1, wherein the controller is configured to cause the laser source to activate in response to conditions determined by the controller to be conducive to persistent contrail formation.

5. The system of claim 1, wherein the first laser beam intersects a formed contrail at a first distance aft of the jet engine of the aircraft, and the second laser beam intersects the formed contrail at a second distance aft of the jet engine of the aircraft, different than the first distance.

6. The system of claim 1, wherein at least one of the first laser beam and the second laser beam is steerable to dynamically move an aim of the at least one of the first laser beam and the second laser beam in response to an indication of a location where contrails have formed.

7. The system of claim 6, wherein the one or more laser beams are swept to cover the location behind the aircraft where contrails form under conditions conducive to contrail formation.

8. The system of claim 1, wherein at least one of the one or more laser beams is generated by a polarized laser that is of optimum polarization for causing ice crystals to better absorb energy from the polarized laser.

9. The system of claim 1, wherein the high power pulsed laser comprises a Neodymium laser, and a wavelength of the first laser beam is 1053 nanometers.

10. The system of claim 1, wherein the first laser beam is of a first wavelength, the second laser beam is of a second wavelength, and the first wavelength is shorter than the second wavelength.

11. The system of claim 1, wherein the one or more positions around the exit of the jet engine are at least three positions around a portion of a circumference of the exit of the jet engine.

12. A method for reducing or eliminating contrails behind an aircraft comprising:
receiving an indication of at least one of contrail formation or conditions determined to be conducive to contrail formation;
activating at least one laser source comprising a bank of fiber lasers positioned within a wing of an aircraft, the bank of fiber lasers having one or more fibers extending from the at least one laser source to one or more positions around an exit of a jet engine attached to the wing, in response to receiving the indication so as to direct at least one laser beam from the one or more fibers at the one or more positions around the exit of the jet engine toward a location at which contrails form aft of a wing of the aircraft; and
reducing or eliminating contrails in response to activating the at least one laser source, wherein the at least one laser source comprises a first fiber laser source generating a first laser beam and a second fiber laser source generating a second laser beam, wherein the first fiber laser source functions as a catalyst, wherein the first laser beam is pulsed and the second laser beam is a continuous wave, and wherein the first laser beam that is pulsed is produced by a high power pulsed laser having a power level of at least 50 joules.

13. The method of claim 12, further comprising:
determining conditions proximate the wing of the aircraft conducive to contrail formation; and
activating the at least one laser source in response to determining conditions proximate the wing of the aircraft conducive to contrail formation.

14. The method of claim 13, wherein determining conditions proximate the wing of the aircraft conducive to contrail formation comprises determining conditions proximate the wing of the aircraft conducive to persistent contrail formation.

15. The method of claim 14, wherein persistent contrails comprise contrails persisting for at least ten minutes.

16. The method of claim 13, wherein the conditions proximate the wing of the aircraft conducive to contrail formation comprise a temperature below a predefined temperature threshold and an altitude above a predefined altitude threshold.

17. The method of claim 12, wherein reducing or eliminating the contrails in response to activating the at least one laser source comprises at least one of:
heating water droplets or ice crystals in the location at which contrails form aft of the wing of the aircraft; or
fragmenting water droplets or ice crystals in the location at which contrails form aft of the wing of the aircraft.

18. The method of claim 12, wherein reducing or eliminating the contrails in response to activating the at least one laser source comprises modifying electromagnetic properties of the contrails, wherein modifying electromagnetic properties of contrails formed by an aircraft in response to activating the at least one laser comprises at least one of:
intercepting, with the at least one laser source, water droplets or ice crystals in the location at which contrails form aft of the wing of the aircraft; or
modifying water droplets or ice crystals in the location at which contrails form aft of the wing of the aircraft to reduce infrared reflective properties of the water droplets or ice crystals.

19. The method of claim 12, wherein the first laser beam is of a first wavelength, the second laser beam is of a second wavelength, and the first wavelength is shorter than the second wavelength.

20. A system for reducing or eliminating contrails behind an aircraft, the system comprising:
a controller; and
a laser source comprising a bank of fiber lasers positioned within a wing of an aircraft, the bank of fiber lasers having one or more fibers extending from the laser source to one or more positions around an exhaust exit of a jet engine attached to the wing, wherein the laser source is configured to emit at least one laser beam from the one or more fibers at the one or more positions around the exhaust exit of the jet engine, wherein the controller is configured to, in response to receiving an indication of at least one of contrail formation or conditions determined to be conducive to contrail formation, cause the laser source to emit the at least one laser beam toward a location behind the aircraft where contrails form under conditions conducive to contrail formation, wherein the laser source comprises a first fiber laser generating a first laser beam and a second fiber laser generating a second laser beam, wherein the first laser beam is produced at a first wavelength that ionizes particles of a contrail, and the second laser beam is produced at a second wavelength, different from the first wavelength, that heats particles of the contrail, and wherein the first laser beam is pulsed and is produced by a high power pulsed laser having a power level of at least 50 joules.

* * * * *